United States Patent [19]

Wilson et al.

[11] Patent Number: 5,113,943
[45] Date of Patent: May 19, 1992

[54] SPACER FLUIDS

[75] Inventors: William N. Wilson, Plano; Roger D. Bradshaw, Allen; Bonsall S. Wilton, McKinney; Robert B. Carpenter, Hurst, all of Tex.

[73] Assignee: Atlantic Richfield Company, Los Angeles, Calif.

[21] Appl. No.: 680,473

[22] Filed: Apr. 2, 1991

Related U.S. Application Data

[62] Division of Ser. No. 441,853, Nov. 27, 1989, Pat. No. 5,030,366.

[51] Int. Cl.$^5$ .............................. E21B 33/06
[52] U.S. Cl. ........................ 166/291; 252/8.551
[58] Field of Search ............ 166/291, 292, 293, 312; 252/8.551

[56] References Cited

U.S. PATENT DOCUMENTS

| | | | |
|---|---|---|---|
| 2,650,905 | 9/1953 | Fordyce et al. | |
| 3,409,080 | 11/1968 | Harrison. | |
| 3,532,168 | 10/1970 | Webb et al. | 166/292 |
| 3,563,930 | 2/1971 | Stram et al. | |
| 3,625,286 | 12/1971 | Parker | 166/291 |
| 3,688,845 | 9/1972 | Messenger | 166/291 |
| 3,749,173 | 7/1973 | Hill et al. | 166/291 |
| 3,820,602 | 6/1974 | Motley et al. | 166/291 |
| 3,849,316 | 11/1974 | Motley et al. | 166/291 |
| 3,850,248 | 11/1974 | Carney | 166/291 |
| 3,863,718 | 2/1975 | Bruist | 166/285 |
| 3,866,683 | 2/1975 | Maly et al. | 166/292 |
| 3,884,302 | 5/1975 | Messenger | 166/291 |
| 3,923,717 | 12/1975 | Lalk et al. | |
| 3,952,805 | 4/1976 | Persinski et al. | 166/293 |
| 4,036,660 | 7/1977 | Persinski et al. | |
| 4,083,407 | 4/1978 | Griffin, Jr. et al. | 166/291 |
| 4,108,779 | 8/1978 | Carney | 166/291 |
| 4,124,075 | 11/1978 | Messenger | 166/293 |
| 4,127,174 | 11/1978 | Sharpe et al. | 166/291 |
| 4,141,843 | 2/1979 | Watson | 166/291 |
| 4,217,229 | 8/1980 | Watson | 166/291 X |
| 4,288,327 | 9/1981 | Godlewski et al. | |
| 4,302,341 | 11/1981 | Watson | 166/291 |
| 4,304,300 | 12/1981 | Watson | 166/291 |
| 4,425,463 | 1/1984 | Walker et al. | |
| 4,439,328 | 3/1984 | Moity. | |
| 4,530,402 | 7/1985 | Smith et al. | 166/291 |
| 4,588,032 | 5/1986 | Weigand et al. | 166/291 |
| 4,601,758 | 7/1986 | Nelson | 166/293 X |
| 4,646,834 | 3/1987 | Bannister | 166/291 |
| 4,681,165 | 7/1987 | Bannister | 166/291 X |
| 4,717,488 | 1/1988 | Seheult et al. | 252/8.551 |
| 4,883,125 | 11/1989 | Wilson et al. | 175/66 X |

FOREIGN PATENT DOCUMENTS 0207536 1/1987 European Pat. Off. .

Primary Examiner—George A. Suchfield
Attorney, Agent, or Firm—Haynes and Boone

[57] ABSTRACT

Spacer fluids providing an effective buffer between drilling fluids and cement slurries during well completion. The spacer fluids comprise a sulfonated styrene copolymer dispersant and one or more additional components such as surfactants, viscosifiers and weighting materials to form a rheologically compatible fluid between the drilling fluid and the cement slurry.

2 Claims, No Drawings

SPACER FLUIDS

This is a divisional of copending application(s) Ser. No. 07/441,853 filed on Nov. 27, 1989, now U.S. Pat. No. 5,030,366.

BACKGROUND OF THE INVENTION

1. Field of the Invention

The present invention pertains to fluids for use in the drilling and completion of oil and gas wells. More specifically, the present invention relates to fluids which form a buffer between and prevent the mixing of various fluids used in the drilling and completion of oil and gas wells. The fluids will be hereinafter referred to as "spacer fluids".

2. Description of the Prior Art

In rotary drilling of wells, a drilling fluid is usually circulated down the drill string and back up the annulus between the drill string and the wellbore face. The drilling fluid can contain many different chemicals, but will most often contain a viscosifier, such as bentonite. When a casing string or liner is to be cemented into the wellbore, any drilling fluid and remnants of the viscosifier present in the wellbore are preferably removed to aid the bonding of the cement between the casing string or liner and the wellbore. In removing this drilling fluid from the wellbore and to clean the annulus, a wash or spacer fluid can be introduced ahead of a cement slurry.

Spacer fluids are conventionally used in cementing operations related to well completion in the following manner. Drilling fluids and cement slurries are typically chemically incompatible fluids which undergo severe gelation or flocculation if allowed to come into contact. Thus, drilling fluid must be removed from the wellbore annulus immediately prior to cement slurry placement. Spacer fluids are pumped between the drilling fluid and the cement slurry to form a buffer and prevent the drilling fluid and the cement slurry from coming into contact.

Spacer fluids should also possess certain rheological tendencies, such as turbulent flow at lower shear rates, which assist in granular solids removal and which encourage the removal of the drilling fluid filter cake from the walls of the well. Indeed, a common cause of failure in primary cementing is the incomplete displacement of drilling fluids which results in the development of mud filled channels in the cement. These mud filled channels may be opened during well production permitting the vertical migration of oil and gas behind the casing.

Conventional spacer fluids are typically composed of an aqueous base fluid and a weighting agent. The weighting agent is included in the composition to increase the density of the spacer fluid to a desired value and to increase the erosion effect of the spacer fluid on the filter cake clinging to the walls of the formation.

The fundamental properties of the aqueous base fluid are typically particle stability in suspension (anti-settling properties), fluid-loss control, favorable rheology, and compatibility with drilling fluids and cement slurries. These properties are directly related to the composition of the spacer fluid.

Consequently, conventional spacer base fluids include at least: i) an anti-settling agent; ii) a fluid loss controlling agent; iii) a dispersing agent; and iv) a surfactant for obtaining a waterwetted surface to aid in cement bonding. As noted above, the final composition of conventional spacer fluids is obtained by adding a weighting agent to the aqueous base fluid.

The anti-settling agent, fluid loss controlling agent and dispersing agent may be constituted by a single component of the composition or by plural components of the composition. In addition, a single component may function as more than one of the above mentioned agents. The agents typically are soluble or dispersible in water.

Depending on the water available on site and on the geological strata encountered, the aqueous base fluid typically includes fresh water, sea water, brine, or an aqueous composition containing one or more dissolved salts, such as NaCl, KCl, $MgCl_2$ and $CaCl_2$. The spacer base fluid, however, must retain its above mentioned fundamental properties at all possible salt concentrations.

Spacer fluids are conventionally used over a wide temperature range spanning from the relatively cool surface temperature to the bottom hole circulating temperature (BHCT) which may reach 200° C. or greater in the case of geothermal wells.

The term "anti-settling properties" refers to the capacity of the spacer fluid to keep the weighting agent particles in stable suspension throughout the cementing operation which may typically last for 1 to 4 hours or longer.

A spacer fluid is considered to have good fluid loss control properties if the fluid loss measured according to API Specification 10, Appendix F is less than 100 ml/30 min, and excellent if the fluid loss is less than 50 ml/30 min.

Favorable rheology of a spacer fluid implies that the fluid has minimum friction pressure while maintaining adequate suspension of solids.

Since the spacer fluid is to be pumped between the drilling fluid and the cement slurry for removing and replacing the drilling fluid in the well annulus, it is very important that the spacer fluid be as compatible as possible with both the drilling fluid and the cement slurry. Such twofold compatibility in the past has been quite difficult to obtain, primarily because the drilling fluid and the cement slurry are incompatible fluids.

The compatibility of a spacer fluid with a drilling fluid and a cement slurry is determined in the laboratory by studying the viscosity of binary or ternary mixtures of spacer fluid with drilling fluid and/or cement slurry varying over the range of 0 to 100% by volume for each component of the mixture.

The compatibility of the spacer fluid with the drilling fluid and the cement slurry is considered to be excellent if the viscosity of a mixture of the spacer fluid and the drilling fluid or the cement slurry at a given shear rate and temperature is equal to or less than the viscosity of the more viscous component of the mixture at the same shear rate and temperature. Likewise, the viscosity of a mixture of all three components is considered to be excellent if it is less than or equal to the viscosity of the most viscous component at the same shear rate and temperature.

Conventional spacer compositions, however, do not usually demonstrate good compatibility with mixtures of drilling fluids and cements while simultaneously presenting good rheological, fluid loss controlling and anti-settling properties over the entire range of shear rates and temperatures normally encountered in oil field services.

The present invention has been developed with a view to providing improved spacer fluids that have enhanced compatibility with drilling fluids and cement slurries, that create and effectively maintain a buffer zone between a drilling fluid and a cement slurry even when all three components become commingled, and that enhance the bond between the cement and the surfaces of the borehole and casing.

SUMMARY OF THE INVENTION

The present invention provides improved spacer fluids which may be interposed between the drilling fluid in the wellbore and either a cement slurry or a drilling fluid which has been converted to a cementitious slurry. The spacer fluid serves as a buffer between the drilling fluid and the cement slurry, and as a flushing agent to evacuate the drilling fluid from the wellbore resulting in improved displacement efficiency regarding drilling fluid removal and improved bonding of the cementitious slurry to surfaces in the wellbore such as the casing or drillpipe wall surfaces.

The spacer fluid of the present invention comprises a sulfonated styrene copolymer dispersant and one or more additional components selected from surfactants, viscosifiers and weighting materials to form a rheologically compatible fluid between the drilling fluid and the cementitious slurry.

The present invention also provides a method of using the spacer fluid. In the method of this invention, a spacer fluid which comprises a sulfonated styrene copolymer dispersant is introduced into the wellbore, and a completion fluid, such as a cement slurry, is introduced to displace the spacer fluid.

Those skilled in the art will further appreciate the above described features of the present invention together with other superior aspects thereof upon reading the detailed description which follows.

DESCRIPTION OF PREFERRED EMBODIMENTS

The overall process of cementing an annular space in a wellbore typically includes the displacement of drilling fluid with a spacer fluid or preflushing medium which will further assure the displacement or removal of the drilling fluid and enhance the bonding of the cement to adjacent structures. For example, it is contemplated that drilling fluid may be displaced from a wellbore, by first pumping into the wellbore a spacer fluid according to the present invention for displacing the drilling fluid which is then in turn displaced by a cement slurry or by the drilling fluid which has been converted to cement, for instance, in accordance with the methods disclosed in U.S. Pat. No. 4,883,125, the entire disclosure of which is hereby incorporated by reference.

According to the present invention it has been determined that sulfonated styrene maleic anhydride copolymer (SS/MA), may be advantageously included in spacer fluids because it is a high charge density material that is capable of dispersing mixtures of drilling fluid and cement slurry. Preferably, the sodium salt of SS/MA is included in the spacer fluids of the present invention. Most preferably, the SS/MA has a molecular weight of 5000 or less which products are commercially available as NARLEX D-72 from National Starch and Chemical Corporation or a product marketed under the trade designation SS/MA 1000 by Chemlink, Inc.

Thus, according to a first embodiment of the present invention, the spacer fluid may comprise SS/MA, dilution water and water base drilling fluid as a viscosifier. Preferably, the spacer fluid comprises 1.0 to 10.0 pounds of SS/MA per barrel of original drilling fluid based on a 42 gallon barrel (hereinafter lb/bbl).

The spacer fluid according to this first embodiment could be advantageously utilized in cementing procedures conducted in remote locations.

According to a second embodiment of the present invention, the spacer fluid comprises: (1) SS/MA for promoting compatibility between the drilling fluid being displaced and the cement slurry following the spacer fluid; (2) Portland cement to densify the spacer fluid and to provide the fluid with weighting and cementitious properties; and (3) a viscosifier selected from welan gum, hydroxyethylcellulose (HEC), carboxymethylhydroxyethyl cellulose (CMHEC), attapulqite, partially hydrolyzed polyacrylamide (PHPA), sepiolite, bentonite, acrylimide, acrylic acid, 2-acrylamido-2-methylpropane sulfonic acid (AMPS) copolymers, polyvinylpyrrolidone (PVP), silicate extenders and drilling fluid from the active mud system or mixtures thereof.

The spacer fluid according to the second embodiment of the present invention may include other conventional cement property modifiers well-known to those of ordinary skill in the art such as surfactants, retarders, dispersants, accelerators, extenders, densifiers, fluid loss additives, and silica flour to stabilize the set product above approximately 250° F.

Welan gum is a polymer made by an Alcaligenes bacteria identified as S-130. The chemical structure of welan gum is disclosed in U.S. Pat. No. 4,342,866, the disclosure of which is hereby specifically incorporated by reference. The gum is a pseudoplastic, high efficiency viscosifier that is tolerant to salt and calcium and is more compatible with cementitious slurries than conventional viscosifiers. The gum also imparts substantial fluid loss control. In addition, welan gum maintains a stable yield point across a broad temperature range for improved solids suspension. The gum is commercially available under the trade name BIOZAN® from Kelco, Inc.

In addition to Portland cement, the spacer fluid according to the second embodiment of the present invention may include conventional weighting materials such as barite or hematite to attain high density ranges when desired.

The spacer composition according to the second embodiment of the present invention (1) provides a buffer zone between the drilling fluid being displaced and the conventional cement slurry following the spacer fluid, (2) enhances the bonding between the conventional cement slurry and the surfaces of the borehole and casing, and (3) sets to provide casing support and corrosion protection.

According to a third embodiment of the present invention, the spacer fluid may comprise, in combination, water, SS/MA as a dispersant with or without anionic and/or nonionic water wetting surfactants, and with or without viscosifying materials such as HEC, CMHEC, PHPA, bentonite, attapulgite, sepiolite and sodium silicate and with or without certain weighting materials such as barite, hematite, illmenite and/or sand to form a rheologically compatible medium for displacing drilling fluid from the wellbore.

According to a fourth embodiment of the present invention, the spacer fluid comprises SS/MA, bentonite, welan gum, surfactant and a weighting agent. Preferably, the spacer fluid according to the fourth embodiment of the present invention comprises a spacer dry mix which includes:

1) 10 to 50% by weight of SS/MA as a dispersant;
2) 40 to 90% by weight of bentonite as a suspending agent; and
3) 1 to 20% by weight of welan gum as a pseudoplastic, high efficiency viscosifier tolerant to salt and calcium, available from Kelco, Inc. under the trade name BIOZAN ®.

The spacer fluid also comprises:

4) 0.01 to 10.0 gal per bbl of aqueous base spacer of an ethoxylated nonylphenol surfactant having a mole ratio of ethylene oxide to nonylphenol ranging from 1.5 to 15, available from GAF under the trade name IGEPAL; and
5) Conventional weighting agents such as barite, hematite and calcium carbonate to provide the desired density. It is preferred that the weighting agent be added to the spacer fluid in an amount to give the spacer fluid a density at least equal to or greater than the density of the drilling fluid and less than or equal to the density of the cement slurry.

The spacer fluid according to the fourth embodiment of the present invention is quite compatible with conventional drilling fluids and cement slurries. The inclusion of SS/MA provides good temperature stability to this spacer fluid so that it has a broad temperature range of applicability. The spacer fluid according to the fourth embodiment of the present invention also has the following advantageous properties:

1) The SS/MA serves as a dispersant to provide enhanced compatibility with drilling fluids and cement slurries, and also as a stabilizer for bentonite at high temperatures.
2) The welan gum works in concert with the bentonite to provide the spacer fluid with the capability of maintaining acceptable suspension characteristics and fluid loss properties at a broad range of temperatures.
3) At high temperatures the bentonite undergoes controlled flocculation to provide long term suspension capability as the welan gum degrades in performance due to the high temperatures.
4) The primary function of the surfactant is a) as a water wetting agent to provide a more acceptable surface for cement bonding after exposure to water or oil base fluids and b) to provide spacer compatibility with water or oil base fluids.
5) The surfactant can also be selected to enhance the gel structure formed by the bentonite and/or the welan gum.

The spacer fluid according to the fourth embodiment of the present invention results in improved primary cementing which in turn benefits external casing corrosion protection, selective stimulation and zonal isolation of producing formations thereby improving the water-:oil ratio of produced fluids.

The spacer fluid according to the fourth embodiment of the present invention acts as an effective buffer between the drilling fluid and the cement slurry, promotes good hole cleaning via turbulent flow, disperses mixtures of well bore fluids to ensure compatibility, and leaves the pipe and formation water wet to improve cement bonding.

The spacer fluid of the fourth embodiment may also include potassium chloride (KCl), sodium chloride (NaCl), calcium chloride (CaCl$_2$), magnesium chloride (MgCl$_2$), quarternary ammonium salts, zirconium oxy chlorides and other materials well known to those of ordinary skill in the art to inhibit the swelling of formation clays thereby preventing damage. In such cases, the spacer fluid preferably comprises about 3-5% by weight of water (BWOW) of KCl. The inclusion of KCl in the spacer fluid of the fourth embodiment makes the spacer fluid especially suitable for use in wells that are known to experience formation damage from fresh water in the well bore annulus.

Table 1 provides mixing information for a spacer fluid according to the fourth embodiment of the present invention. The spacer dry mix is prepared according to the above formula and for the particular spacer fluids illustrated in Table 1 comprises about 33-34% by weight of SS/MA, about 62-63% by weight of bentonite and about 4-5% by weight of welan gum. The sequence of addition of any of the spacer mix components is not critical. In practice the dry ingredients are preblended and bagged for easy handling. The spacer dry mix should be hydrated before adding weighting material. In Table 1 the abbreviation "ppg" means pounds per gallon of the drilling fluid.

TABLE 1

| SPACER MIXING PROCEDURE 1 BBL BASE SPACER | | | |
|---|---|---|---|
| SPACER DENSITY (ppg) | LBS SPACER DRY MIX | GAL WATER | LBS BARITE |
| 9 | 22.8 | 39.6 | 23 |
| 10 | 21 | 38.1 | 79 |
| 11 | 19.2 | 36.6 | 135 |
| 12 | 17.3 | 35.2 | 191 |
| 13 | 15.4 | 33.7 | 247 |
| 14 | 13.6 | 32.3 | 303 |
| 15 | 11.8 | 30.8 | 359 |
| 16 | 10 | 29.3 | 416 |
| 17 | 8.7 | 27.8 | 471 |
| 18 | 7.3 | 26.3 | 527 |
| 19 | 6 | 24.9 | 582 |

To complete the spacer fluids represented in Table 1, an ethoxylated nonylphenol surfactant material is added to the fluid. Ethoxylated nonylphenol surfactants are made up of a hydrophobic component—nonylphenol and a hydrophilic component—ethylene oxide. A series of products with different hydrophobic—hydrophilic balances may be generated by altering the ratio of ethylene oxide to nonylphenol. The chemical structure of these surfactants is that of a polyoxyethylated nonylphenol, which may be represented by the following formula:

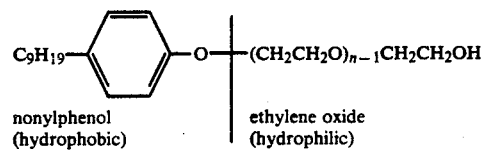

nonylphenol (hydrophobic)     ethylene oxide (hydrophilic)

where n represents the number of moles of ethylene oxide per mole of nonylphenol.

The water solubility of these surfactants is directly proportional to the value of n.

For example, to produce a completed water base spacer fluid from the compositions represented in Table 1, 0.2 gallons of an ethoxylated nonylphenol surfactant containing 23% ethylene oxide and having a mole ratio of ethylene oxide per mole of nonylphenol of 1.5 is added per 1 bbl of hydrated base spacer mix. A suitable ethoxylated nonylphenol surfactant for this purpose is available from GAF under the trade name IGEPAL CO-210.

Also for example, to produce a completed oil base spacer fluid from the compositions represented in Table 1, 2.0 gallons of an ethoxylated nonylphenol surfactant containing 65% ethylene oxide and having a mole ratio of ethylene oxide per mole of nonylphenol of 9 is added per 1 bbl of hydrated base spacer mix. A suitable ethoxylated nonylphenol surfactant for this purpose is available from GAF under the trade name IGEPAL CO-630. This amount of surfactant prevents most emulsions from forming; however, if compatibility testing shows a higher yield point (YP) than desired, such as a YP over 50, or if oil wetting occurs, additional surfactant may be added in increments of 0.2 gal/bbl until the desired result is achieved.

As noted above, 3-5% KCl by weight of water (BWOW), typically, may be added to the hydrated spacer fluids represented in Table 1 on an as needed basis to inhibit formation clay swelling and thereby minimize formation damage in fresh water sensitive zones. As shown in Table 2, the addition of KCl will increase the low temperature viscosity of the spacer fluid. Adding KCl prior to hydration of the mix would result in lower viscosity throughout the temperature range as compared to a mixture that did not include KCl.

TABLE 2

| SPACER DENSITY | SPACER RHEOLOGY DATA YIELD POINTS @ 80 & 180° F. | | | |
|---|---|---|---|---|
| | YP @ 80° | YP @ 180° | YP @ 80° w/KCl | YP @ 180° w/KCl |
| 9 | 9 | 12 | 24 | 9 |
| 10 | 7 | 12 | | |
| 11 | 10 | 12 | | |
| 12 | 9 | 11 | | |
| 13 | 8 | 10 | | |
| 14 | 12 | 12 | 39 | 9 |
| 15 | 11 | 9 | | |
| 16 | 16 | 10 | | |
| 17 | 17 | 10 | | |
| 18 | 21 | 10 | | |
| 19 | 26 | 10 | 40 | 9 |

The rheological properties indicated in Table 2 and the tables herein, including yield point (YP) and plastic viscosity (PV) indicated in pounds per hundred feet squared, were measured with a Model 35 Fann viscometer utilizing a #1 bob and sleeve and a #1 spring. A Fann viscometer uses a rotor and a bob which is attached to a spring, to measure the shear stress factor in a fluid. The bob and rotor are immersed in the fluid which is contained in a stationary test cup. The rotor, arranged in concentric alignment with the bob, causes the fluid to move at various shear rates, while the bob, by means of the attached spring, measures the torque exerted on itself.

Table 3 shows a performance comparison between various spacer fluids represented in Table 1 that do not contain KCl and four commercially available prior art spacer fluids with a neat cement slurry and a highly reactive water base drilling fluid from a South Texas well.

TABLE 3

DISPERSING POWER OF SPACER FLUIDS
(Yield Points @ 80° F. for a 25% cement,
25% drilling fluid and 50% spacer fluid by volume mixture)

| spacer density | 9 ppg YP | 14 ppg YP | 19 ppg YP |
|---|---|---|---|
| present invention | 8 | 16 | 20 |
| prior art A | 76 | 106 | 158 |
| prior art B | 82 | 78 | 82 |
| prior art C | 19 | 40 | 68 |
| prior art D | 86 | 120 | 234 |

As shown in Table 3, the spacer composition according to the fourth embodiment of the present invention demonstrates clear superiority over the prior art compositions as demonstrated by its consistently lower yield point upon contamination with downhole fluids.

Spacer compositions in accordance with the fourth embodiment of the present invention will be described in more detail with reference to the following examples. These examples are merely illustrative of the present invention and are not intended to be limiting.

EXAMPLE 1

Bayou Sale #1: 7" Liner Water Base Drilling Fluid Spacer Performance

A water base drilling fluid spacer composition in accordance with the fourth embodiment of the present invention having a density of 17.2 ppg was prepared according to the following formula: 11.2 lb/bbl spacer dry mix comprising 33.3% SS/MA, 62.5% bentonite and 4.2% um; 27.7 gal/bbl of fresh water; 478 lbs barite; and 0.1 gal/bbl of surfactant having a mole ratio of ethylene oxide to nonylphenol of 1.5. The fresh water base drilling fluid had a density of approximately 17.0 ppg and the fresh water base cement slurry had a density of 17.5 ppg.

The rheological properties of this spacer composition as well as the water base drilling fluid, cement slurry and various mixtures thereof are presented in Table 4.

TABLE 4

| | Fann Rheology | | | | |
|---|---|---|---|---|---|
| | Temp °F. | 600 | 300 | PV | YP |
| Water base spacer | 80 | 145 | 85 | 60 | 25 |
| | 190 | 105 | 64 | 41 | 23 |
| Water base mud (WBM) | 80 | 188 | 143 | 45 | 98 |
| | 190 | 81 | 49 | 32 | 17 |
| Cement slurry (CMT) | 80 | 447 | 231 | 216 | 15 |
| | 190 | 247 | 137 | 110 | 27 |
| 95% spacer/5% WBM | 80 | 154 | 91 | 63 | 28 |
| | 190 | 84 | 53 | 31 | 22 |
| 5% spacer/95% WBM | 80 | 185 | 145 | 40 | 105 |
| | 190 | 101 | 67 | 34 | 33 |
| 50% spacer/50% WBM | 80 | 164 | 121 | 43 | 78 |
| | 190 | 90 | 61 | 29 | 32 |
| 95% spacer/5% CMT | 80 | 161 | 97 | 64 | 33 |
| | 190 | 113 | 74 | 39 | 35 |
| 5% spacer/95% CMT | 80 | 439 | 220 | 129 | 1 |
| | 190 | 213 | 120 | 93 | 27 |
| 50% spacer/50% CMT | 80 | 225 | 157 | 64 | 33 |
| | 190 | 164 | 101 | 63 | 38 |

EXAMPLE 2

Ship Shoal 332: 7" Liner Oil Base Drilling Fluid Spacer Performance

An oil base drilling fluid spacer composition in accordance with the fourth embodiment of the present invention having a density of 16 ppg was prepared according to the following formula: 6.25 lbs. bentonite; 3.33 lbs. SS/MA; 0.42 lbs Biozan ®; 29.3 gal water; 416 lbs. barite; and 2.0 gal of surfactant having a mole ratio of ethylene oxide to nonylphenol 9 to prepare 1.0 bbl plus the 2 gallons of surfactant for a total of 44 gallons of the spacer composition. The oil base drilling fluid was an invert oil mud having a density of 15.8 ppg. The cement had a density of 16.5 ppg.

The rheological properties of this spacer composition are presented in Table 5.

TABLE 5

| | Fann Rheology | | | | |
|---|---|---|---|---|---|
| | Temp °F. | 600 | 300 | PV | YP |
| Oil base spacer | 80 | 167 | 98 | 69 | 29 |
| | 152 | 97 | 55 | 42 | 13 |
| Oil base mud (OBM) | 80 | 124 | 65 | 59 | 6 |
| | 152 | 74 | 40 | 34 | 6 |
| Cement slurry (CMT)* | 80 | 494 | 286 | 208 | 82 |
| | 152 | 229 | 127 | 102 | 25 |
| 75% Spacer/25% OBM | 80 | 167 | 94 | 73 | 21 |
| | 152 | 115 | 74 | 41 | 33 |
| 25% Spacer/75% OBM | 80 | 121 | 70 | 51 | 19 |
| | 152 | 120 | 70 | 50 | 20 |
| 50% Spacer/50% OBM | 80 | 128 | 75 | 53 | 22 |
| | 152 | 98 | 62 | 36 | 26 |
| 75% Spacer/25% CMT | 80 | 233 | 143 | 90 | 53 |
| | 152 | 152 | 88 | 64 | 24 |
| 25% Spacer/75% CMT | 80 | 318 | 182 | 136 | 46 |
| | 152 | 173 | 95 | 78 | 17 |
| 50% Spacer/50% CMT | 80 | 248 | 148 | 100 | 48 |
| | 152 | 157 | 99 | 58 | 41 |
| 25% OBM/50% Spacer/ | 80 | 167 | 96 | 71 | 25 |
| 25% CMT | 152 | 143 | 85 | 58 | 27 |
| Prior art oil base | 80 | 49 | 25 | 24 | 1 |
| spacer | 152 | 37 | 20 | 17 | 3 |
| Oil base mud (OBM) | 80 | 124 | 65 | 59 | 6 |
| | 152 | 74 | 40 | 34 | 6 |
| Cement slurry (CMT)** | 80 | 306 | 170 | 136 | 34 |
| | 152 | 150 | 78 | 72 | 6 |
| 75% spacer/25% OBM | 80 | 167 | 114 | 53 | 61 |
| | 152 | 108 | 86 | 22 | 64 |
| 25% spacer/75% OBM | 80 | 222 | 117 | 105 | 12 |
| | 152 | 163 | 94 | 69 | 25 |
| 50% spacer/50% OBM | 80 | 259 | 168 | 91 | 77 |
| | 152 | 136 | 96 | 40 | 56 |
| 75% spacer/25% CMT | 80 | 120 | 84 | 36 | 48 |
| | 152 | 75 | 47 | 28 | 19 |
| 25% spacer/75% CMT | 80 | 212 | 119 | 93 | 26 |
| | 152 | 100 | 55 | 45 | 10 |
| 50% spacer/50% CMT | 80 | 170 | 104 | 66 | 38 |
| | 152 | 88 | 51 | 37 | 14 |
| 25% OBM/50% spacer/ | 80 | 202 | 149 | 55 | 96 |
| 25% CMT | 152 | 95 | 65 | 30 | 35 |

*Cement slurry included Class H cement, 8% hematite, 1.4% of a latex based fluid loss additive, 0.35% of sodium metasilicate, 0.35% of a liqnosulfonate retarder at a density of 16.5 ppg.
**Cement slurry included Class H cement, 8% hematite, 1.35% of a latex based fluid loss additive, 0.2% of sodium metasilicate 0.3% of a lignosulfonate retarder at a density of 16.5 ppg.

The results shown in Table 5 demonstrate that while the spacer of the present invention and the prior art spacer performed without major rheological incompatibilities, the spacer of the present invention demonstrated markedly superior results in the following areas:
1) Water-wetting and clean-up characteristics which leads to enhanced bonding and displacement; and
2) compatibility; negligible gelation increases the displacement efficiency of the spacer.

EXAMPLE 3

Mississippi Canyon 160: 13-33/8" Casing Water Base Drilling Fluid Spacer Performance A water base drilling fluid spacer composition including KCl was prepared in accordance with the fourth embodiment of the present invention. The spacer fluid had a density of 12 ppg and was prepared according to the following formula: 12.5 lbs bentonite; 8.5 lbs KCl; 2.8 lbs SS/MA; 1.7 lbs Biozan ®; 35.6 gal sea water; 180 lbs barite; and 0.2 gal of surfactant having a mole ratio of ethylene oxide to nonylphenol of 1.5 to prepare 1.0 bbl of the spacer composition. The sea water base drilling fluid had a density of 11.8 ppg and the sea water base cement slurry had a density of 12.5 ppg.

The rheological properties of this spacer composition as well as a water base mud and cement slurry and various mixtures thereof are presented in Table 6.

TABLE 6

| | Fann Rheology @ 105° F. | | | |
|---|---|---|---|---|
| | 600 | 300 | PV | YP |
| Water base spacer | 44 | 29 | 15 | 14 |
| Water base mud | 94 | 62 | 32 | 30 |
| Cement slurry (CMT) | 29 | 22 | 7 | 15 |
| 95% Spacer/5% WBM | 79 | 60 | 19 | 41 |
| 5% Spacer/95% WBM | 70 | 45 | 25 | 20 |
| 50% Spacer/50% WBM | 63 | 41 | 22 | 19 |
| 95% Spacer/5% CMT | 52 | 36 | 16 | 20 |
| 5% Spacer/95% CMT | 52 | 37 | 15 | 22 |
| 50% Spacer/50% CMT | 62 | 42 | 20 | 22 |
| 25% WBM/50% Spacer/ 25% CMT | 88 | 61 | 27 | 34 |

According to a fifth embodiment of the present invention, the spacer fluid may be used as a preflush material. According to this embodiment the preflush material comprises SS/MA, water and surfactant. Preferably, three (3) lbs/bbl of the preflush composition is combined with 0.2 gal/bbl of an ethoxylated nonylphenol surfactant, preferably one having 23% ethylene oxide and a mole ratio of ethylene oxide to nonylphenol of 1.5, such as Igepal CO 210 surfactant available from GAF. The resulting preflush composition is an excellent dispersing wash for applications involving water base drilling fluids containing highly reactive clays that normally cause severe flocculation problems during cementing operations. This preflush composition will handle almost any contamination problem and prepare the wellbore annulus for improved cement bonding. Compatibility testing of the preflush composition has shown it to be a very strong dispersant capable of handling even the worst drilling fluid and cement slurry flocculations. Table 7 shows a direct comparison of performance at Prudhoe Bay for the preflush composition of the present invention and three commercially available preflush compositions with an identical water base drilling fluids (9-⅝" casing point) and cement slurry (BJ/Titan s blend). The yield points were taken at 80° F for a mixture of 25% drilling fluid, 25% cement slurry and 50% preflush.

TABLE 7

| DISPERSING POWER OF PREFLUSH | | | |
|---|---|---|---|
| Present Invention | Prior Art X | Prior Art Y | Prior Art Z |
| YP  4 | 19 | 19 | 37 |

Also according to the fifth embodiment of the present invention, three (3) lbs/bbl of the preflush composition are preferably combined with 2.0 gal/bbl of an ethoxylated nonylphenol surfactant, preferably one having 65% ethylene oxide and a mole ratio of ethylene oxide to nonylphenol of 9, such as Igepal CO 630 surfactant available from GAF. The resulting preflush composition is an excellant dispersing wash for applications involving oil base drilling fluids. This preflush composition will handle almost any contamination problem and prepare the wellbore annulus for improved cement bonding.

Although preferred embodiments of the present invention have been described in some detail herein, various substitutions and modifications may be made to the compositions and methods of the invention without departing from the scope and spirit of the appended claims.

What is claimed is:

1. A method for cementing a wellbore penetrating an earth formation into which a conduit extends, said wellbore having a space occupied by a drilling fluid, said method comprising the steps of:
   a) displacing said drilling fluid from said space with a spacer fluid comprising:
      sulfonated styrene-maleic anhydride copolymer, bentonite, welan gum, surfactant and a weighting agent; and
   b) displacing said spacer composition and filling said wellbore space with a settable cement composition.

2. A method for displacing drilling fluid from an oil well or gas well comprising the step of:
   displacing said drilling fluid with a spacer fluid comprising sulfonated styrene-maleic anhydride coopolymer, bentonite, welan gum, surfactant and a weighting agent.

* * * * *